(12) United States Patent
Minerich

(10) Patent No.: US 8,515,208 B2
(45) Date of Patent: Aug. 20, 2013

(54) METHOD FOR DOCUMENT TO TEMPLATE ALIGNMENT

(75) Inventor: Richard T. Minerich, Hoboken, NJ (US)

(73) Assignee: Kofax, Inc., Irvine, CA (US)

( * ) Notice: Subject to any disclaimer, the term of this patent is extended or adjusted under 35 U.S.C. 154(b) by 330 days.

(21) Appl. No.: 13/080,163

(22) Filed: Apr. 5, 2011

(65) Prior Publication Data

US 2011/0243477 A1    Oct. 6, 2011

Related U.S. Application Data

(60) Provisional application No. 61/320,899, filed on Apr. 5, 2010.

(51) Int. Cl.
*G06K 9/32* (2006.01)

(52) U.S. Cl.
USPC .......................... 382/294; 382/209; 382/217

(58) Field of Classification Search
USPC ......... 382/184, 209, 217, 287, 294; 707/779; 715/235
See application file for complete search history.

(56) References Cited

U.S. PATENT DOCUMENTS

| 5,020,112 | A | * | 5/1991 | Chou | 382/226 |
| 6,016,361 | A | * | 1/2000 | Hongu et al. | 382/209 |
| 2008/0219543 | A1 | * | 9/2008 | Csulits et al. | 382/135 |

OTHER PUBLICATIONS

TDB-ACC-No. NB9306177, 'Morphological Techniques for Determining Bounding Rectangles and Octagons', Jun. 1, 1993.*

* cited by examiner

*Primary Examiner* — Gregory F Cunningham
(74) *Attorney, Agent, or Firm* — Zilka-Kotab, PC

(57) ABSTRACT

A method for aligning a document to a template includes identifying image-bounding rectangles of the document and of the template, identifying center points of the image bounding rectangles and of the document and the template, iteratively transforming the template to match the center points and the image bounding rectangles of the document, and aggregating in a matrix the transformations of the template. The method also includes applying to the document the inverse of the transform matrix.

21 Claims, 6 Drawing Sheets

METHOD FOR DOCUMENT TO TEMPLATE ALIGNMENT

CROSS REFERENCE TO RELATED APPLICATIONS

The present application is a non-provisional of and claims the benefit of U.S. App. Ser. No. 61/320,899, filed Apr. 5, 2010, which is hereby incorporated herein by reference in its entirety.

FIELD OF THE INVENTION

The present invention relates generally to image processing, and, more particularly, embodiments of the invention relate to mutual alignment of a document image to a template image.

BACKGROUND OF THE INVENTION

Various methods are known for aligning a document to a template, and are particularly used in the field of optical character recognition (OCR). For example, one known technique for aligning a template with a document is to calculate correlation factors between a plurality of reference character templates and each in a sequence of document characters, at a variety of different relative positions, and to select the highest correlation factor for each character. Such a technique, while yielding accurate positioning data and simultaneously providing a starting set of OCR data, is computationally too intensive to yield economical throughput. That is, because each correlation factor involves on the order of n 2 calculations (where n is the height in pixels of a typical character and is ordinarily around 40) and because a typical library of reference character templates has about 100 entries, the number of calculations needed to obtain a correlation factor for each template is already very high. To add even a small 3×3 grid search for the highest correlation factor for each template, so as to verify common orientation of document and template, multiplies that already high number by a factor of 9. Moreover, this technique provides little assurance that a scanned document has been fully scanned—in other words, a vertical streak of letters missed due to, e.g., folding during document feeding, may not be detected. Failure to detect missed characters can be of particular consequence during automated processing of documents such as, e.g., tax forms, mortgage disclosures, or other financial papers. However, OCR done with a reliable level of assurance as to completeness can greatly enhance efficiency of document processing for exactly these sorts of documents, which typically are based on standard templates.

Thus, it is generally desirable to have a document to template alignment method that is customizable and is able to detect misalignments with a high degree of certainty. Moreover, it is desirable to have a method that reduces CPU time costs.

SUMMARY OF THE INVENTION

It is an object of the present invention to provide a method of document to template alignment.

It is an additional object of the present invention to provide a method of document to template alignment that detects misalignments with a high degree of certainty.

It is an additional object of the present invention to provide a method of document to template alignment that is customizable.

It is an additional object of the present invention to provide a method of document to template alignment that reduces CPU time costs.

An embodiment of the present invention is a method for aligning a document to a template includes identifying image-bounding rectangles of the document and of the template, identifying center points of the image bounding rectangles of the document and the template, iteratively transforming the template to match the center points and the image bounding rectangles of the document, and aggregating in a matrix the transformations of the template. The method also includes applying to the document the inverse of the transform matrix.

Another embodiment of the present invention is an apparatus for aligning an electronic image of a document to an electronic image of a template that includes a processor configured by instructions to obtain the electronic image of the document and identify, within the electronic image of the document, connected components of the document. The apparatus further determines document image-bounding rectangles corresponding to at least some of the connected components of the document, and iteratively transforms predetermined template image-bounding rectangles to match the document image-bounding rectangles. In addition, the apparatus aggregates transformations of the template image-bounding rectangles to generate a transform matrix and transforms the electronic image of the document according to an inverse of the transform matrix. The apparatus further includes a data storage device, connected in communication with the processor, which stores at least one of the instructions, the electronic image of the document, or the electronic image of the template.

These and other objects, features and advantages of the present invention will become apparent in light of the detailed description of the best mode embodiment thereof, as illustrated in the accompanying drawings.

DETAILED DESCRIPTION OF THE INVENTION

In context of the inventive method, the words "document" and "template" generally are meant to refer to electronic images that can be manipulated by a general purpose or custom-designed data processor. A "connected component", within either a document or a template, is a contiguous image area or visual feature of substantially uniform or homogeneous color, opacity, and/or brightness. Connected components can be overlapping within the same electronic image, and can be oriented at any angle with reference to each other and to the overall image. One example of a connected component is a printed letter. Another example is a line. A third example is a reverse-printed header, where the header text is transparent within a printed header background.

It has been noted that many documents, especially financial form documents, include sets of connected components that can distinguish documents of a particular "family" from documents of other families. For example, a 1040-EZ tax form includes noticeably different connected components than does an auto loan application.

According to embodiments of the present invention, a connected component may be represented for computational purposes by an image-bounding rectangle that entirely encloses the connected component, possibly along with externally adjacent or internal white space. For convenience and brevity within the following description of the drawings, image-bounding rectangles sometimes are referred to as "components".

Figure 1:
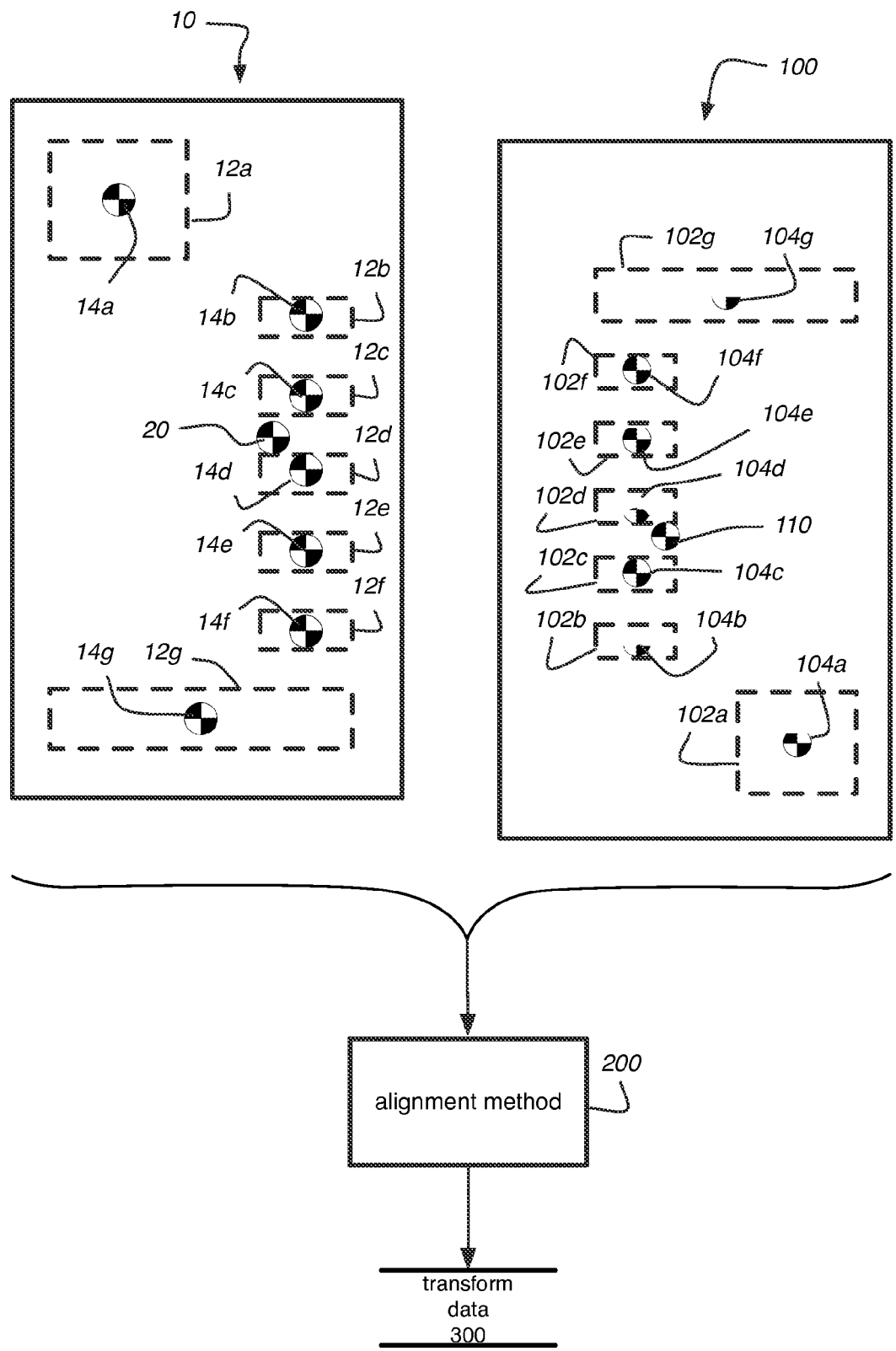
FIG. 1 shows a schematic process flow chart of a method for generating template-to-document transform data, according to an embodiment of the present invention.

Thus, as shown in FIG. 1, the inventive method 200 for aligning a document 10 to a template 100 is based on iteratively adjusting a set or plurality of image-bounding rectangles or template components 102a, b, . . . , corresponding to connected components in the template, to match a set of image-bounding rectangles or document components 12a, b, . . . ( ) that correspond to connected components in the document, thereby generating transform data 300 that describes manipulation or alignment of the document 10 to approximately match the template 100. In some embodiments of the inventive method 200, a threshold criterion is applied to exclude image-bounding rectangles of less than a pre-determined size, thereby reducing CPU time cost for implementing the method. For example, the threshold criterion may exclude single-character bounding rectangles.

As shown in FIG. 1 the document 10 and the template 100 are reversed by 180 degreees and are differently scaled. Typically, the inventive method is applicable to less extreme differences between document and template. For example, in some embodiments, it is expected that document and template will be only a few degrees different in angle, less than about an inch apart in translation, and less than about 15% different in scale. In such embodiments, heuristics used by the inventive method 200 (as further discussed below with reference to FIG. 6) can be set to cause selection of a different template, should greater differences be detected.

FIGS. 2-6 show a process flow diagram of the inventive alignment method 200, which includes three processes for generating and manipulating transform data 300. Generally, the inventive alignment process 200 involves selecting a series of affine transforms that produce a locally optimal alignment of the template 100 to the document 10. Throughout the process 200, the series of affine transformations are compressible to a single affine transformation or transform matrix, which can then be inverted and used to adjust pixels or regions of the document 10 without a whole-image transformation. Thus, the inventive alignment method 200 provides for vastly increased performance over prior methods, in cases when the entire document need not be transformed. In some embodiments, the series of affine transforms can be maintained in the transform data 300 for debugging purposes.

Figure 2:
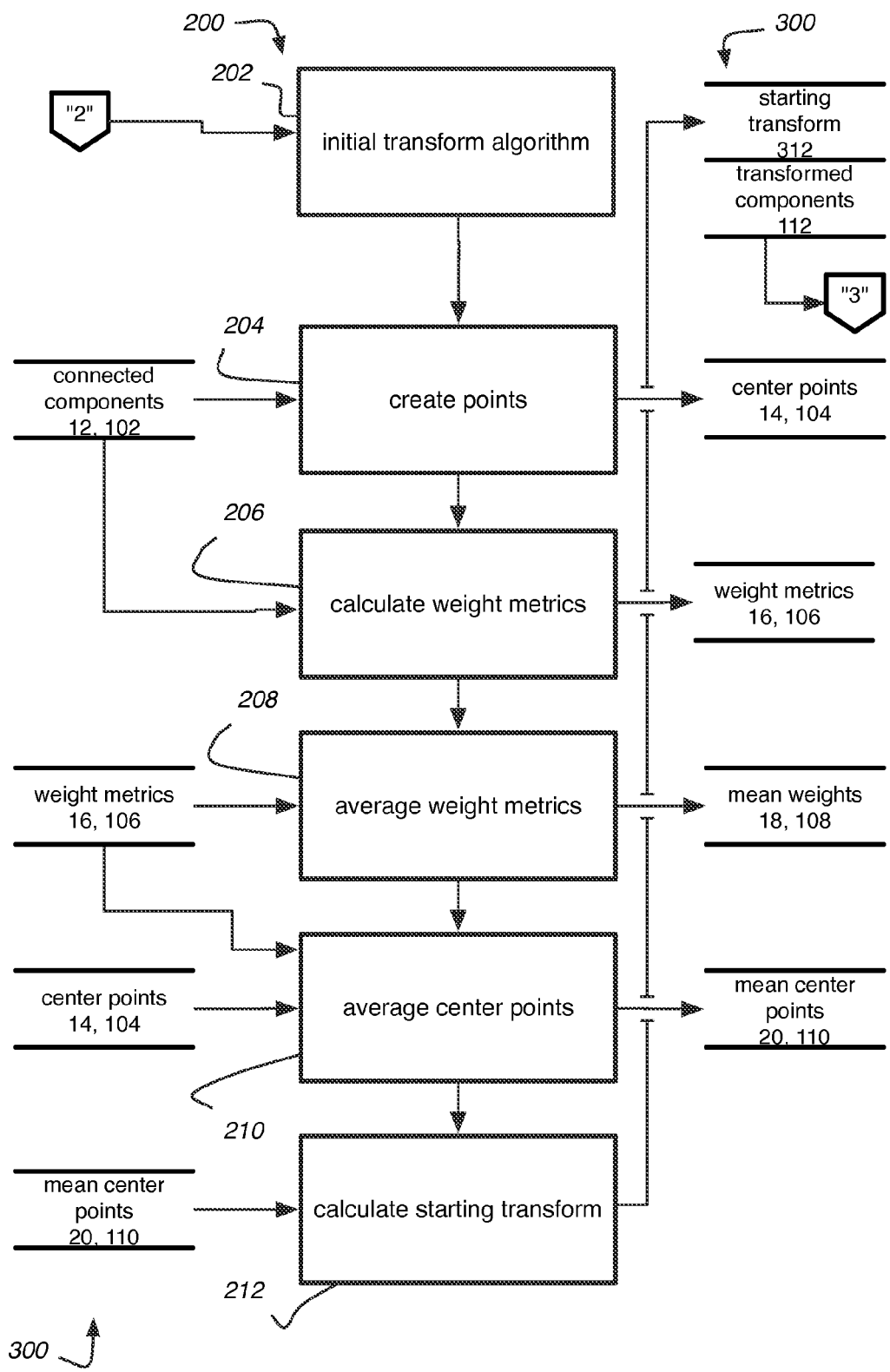
FIGS. 2-6 show details of the method shown in FIG. 1.

In the first process, shown in FIG. 2, an initial transform algorithm 202 is implemented to find an approximate starting transform 312. In execution of the algorithm 202, at a step 204 a set of points 14a, b, . . . is created representing the center of each image-bounding rectangle 12a, b, . . . in the document 10. A matching set of points 104a, b, . . . also is created representing the center of each image-bounding rectangle 102a, b, . . . in the template 100. These center points 14, 104 also are shown in FIG. 1.

Referring back to FIG. 2, at a step 206, the algorithm 202 calculates for each image-bounding rectangle 12 or 102 a weight metric 16 or 106, which is the square root of the represented connected component's area. Also in the step 206, the algorithm associates each weight metric 16 or 106 with the center point 14 or 104 of the image bounding rectangle 12 or 102.

At a step 208, the weight metrics 16 or 106 are then averaged to find respective mean square root weights 18 and 108 of the document 10 and the template 100. At a step 210, the sets of center points 14 or 104 also are averaged as multiples of the weight metrics 16 or 106 to find single points 20 or 110 representing the respective mean weighted centers of the document 10 or of the template 100. These mean weighted center points 20, 110 also are shown in FIG. 1.

Figure 4:
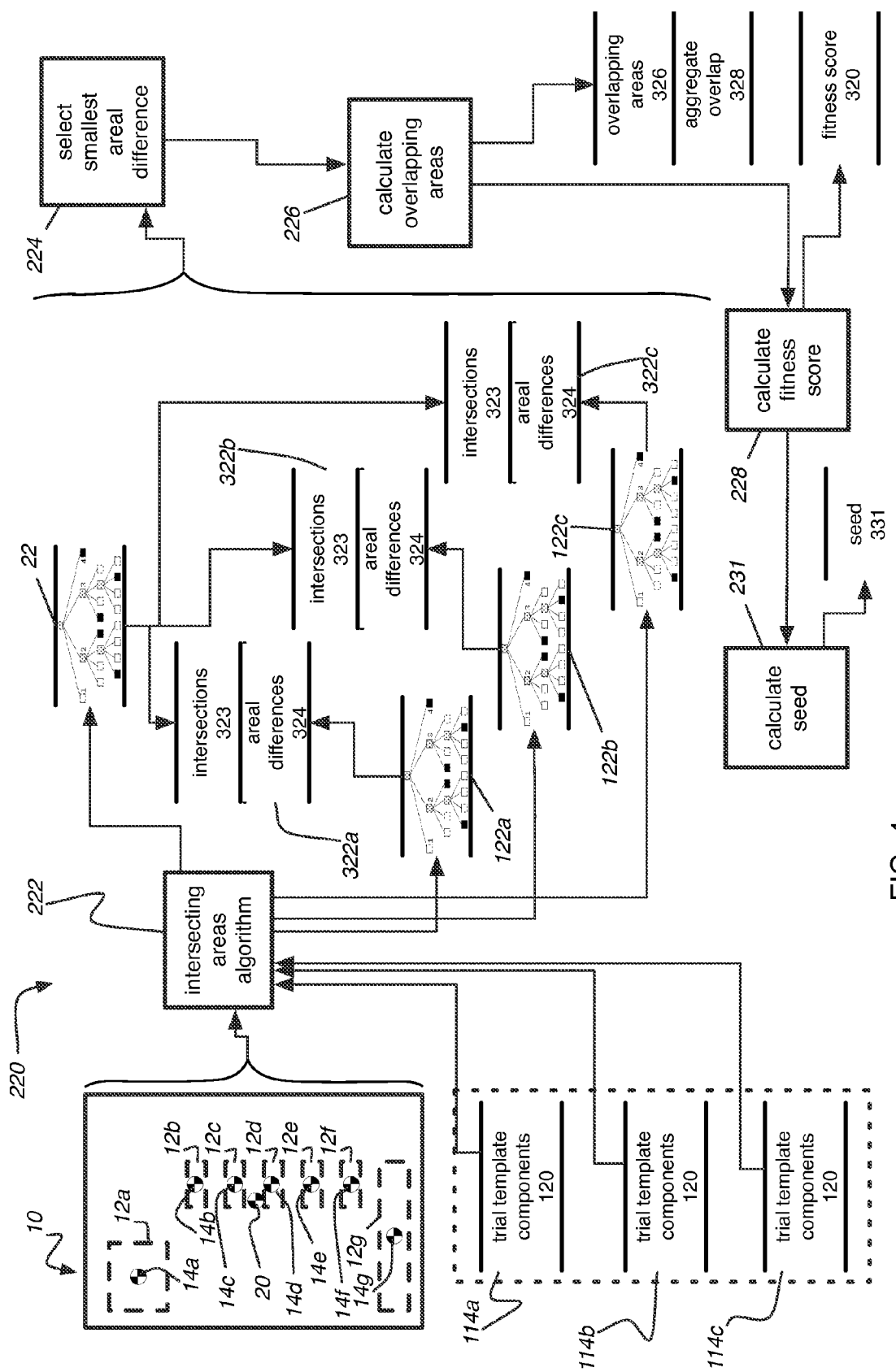
Figure 5:
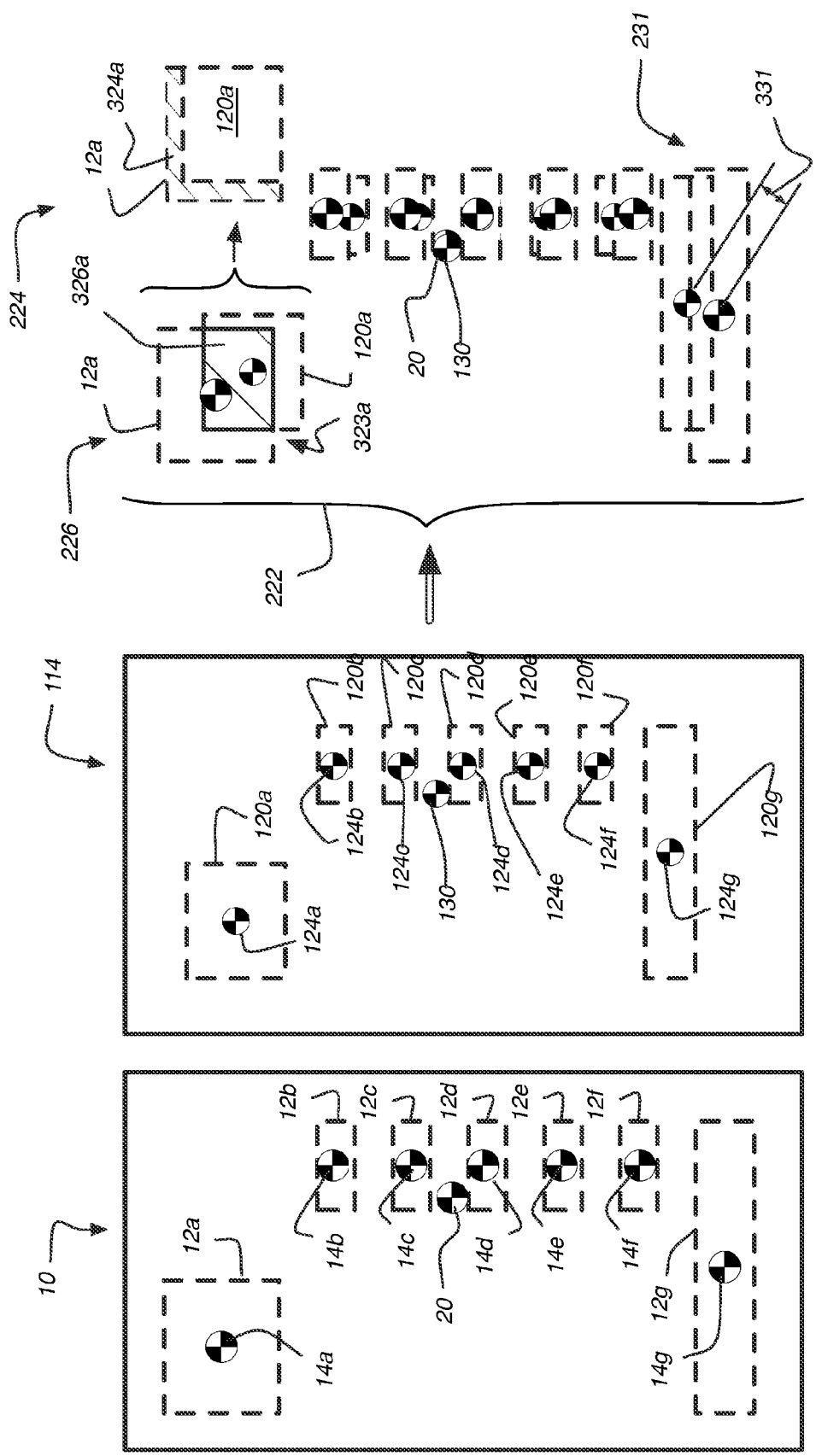

Still referring to FIG. 2, at a step 212 the initial starting transform 312 is calculated to align the template weighted center point 110 with the document weighted center point 20. In embodiments of the invention, this transform 312 is applied uniformly to each and all of the set of template components 102 to generate transformed template components 112. The transformed template components 112, and the starting transform 312, then are passed on to a two-stage hill-climbing technique or process 214 as shown in FIGS. 3-5.

Figure 3:
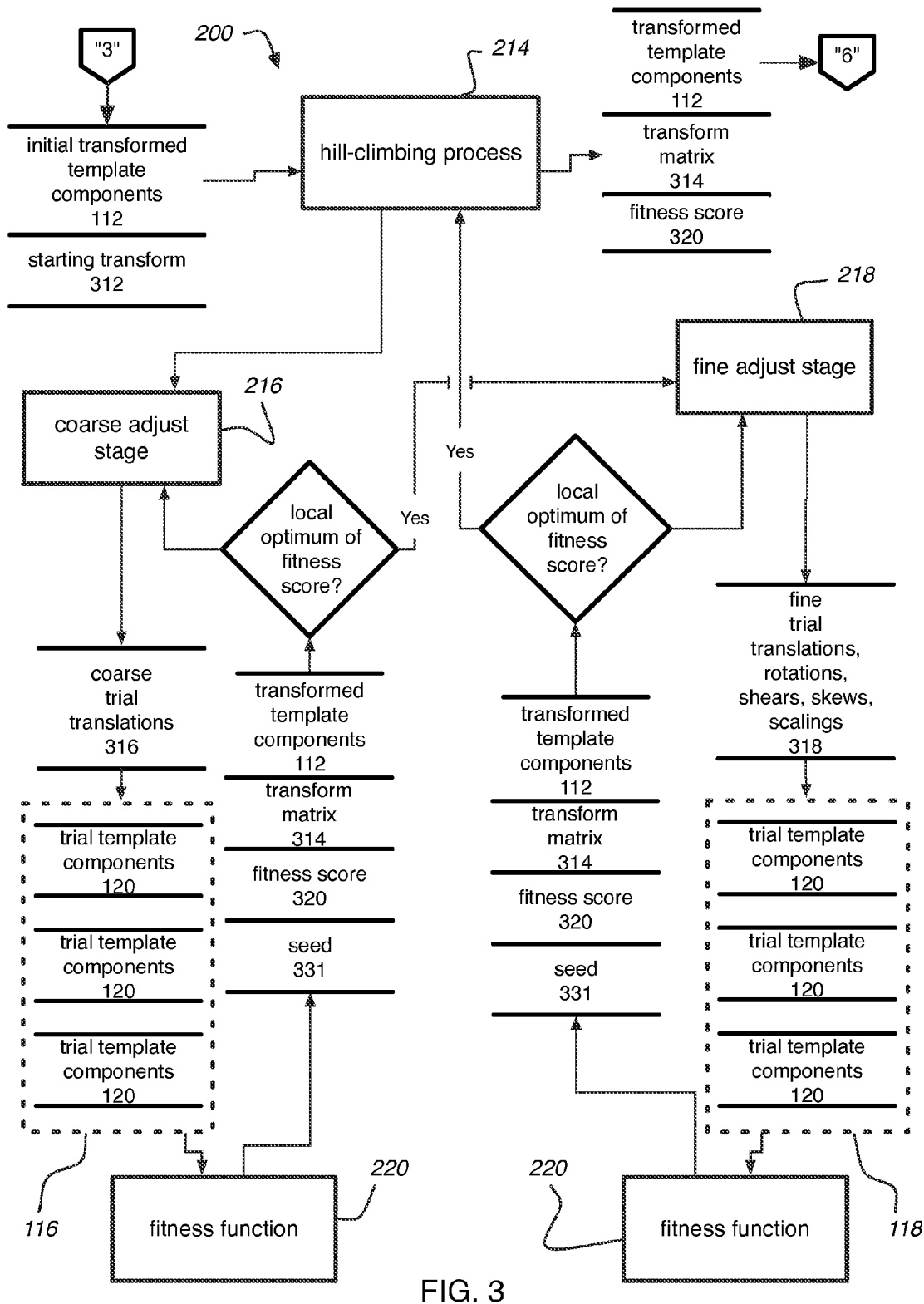

As shown in FIG. 3, the hill-climbing process 214 includes two stages 216, 218 that are used sequentially to identify a locally optimal transform matrix 314. In each stage of the hill-climbing process 214, each of a set of trial transformations 316 or 318 is applied to the transformed template 112, thereby producing a set of trial templates 116 or 118, each trial image corresponding to one of the trial transforms. The trial templates then are scored by a fitness function 220 according to pre-determined criteria, and the highest-scoring trial template is accepted along with its corresponding trial transform 316 or 318. The accepted trial template becomes a new transformed template 112, while the accepted transform is incorporated into the transform matrix 314. The process then repeats by applying a new set of trial transforms to the transformed template. When no trial template image gets a higher score than the presently accepted template image, the stage or process exits.

In the inventive method 200, the two distinct stages 216, 218 follow the sequence outlined above. In particular, each trial transform 316 or 318 is applied uniformly across the set of transformed template image-bounding rectangles 112 to produce trial templates 116 or 118 including trial rectangles or components 120. However, by contrast to known methods for hill-climbing, the fitting of affine transformations is broken up into stages where large scaling transforms are attempted at first and then finer adjustments are made later. Thus, in each stage 216 or 218, different types of transforms 316 or 318 are applied to produce trial templates 116 or 118, as further discussed below. In some embodiments of the invention, each set of trial transformations 316 or 318 is pre-determined. In some embodiments, each set of trial transformations 316 or 318 is generated from a pre-determined set of transformations, based on a seed value. In other embodiments, each set of trial transformations 316 or 318 may be generated from the transform matrix 314, based on a seed value.

The seed value mentioned above can be generated based on comparison of a trial template 116 or 118 to the document 10, as further discussed below. In some embodiments, conditional sets of transforms could be selected, based on the seed value, following selected affine transformations. In some embodiments, the observations or measurements could be taken following each transform; in other embodiments, the observations could be taken at a pre-determined periodicity; in yet other embodiments, the observations could be taken at a periodicity determined according to a previous observation.

Each stage 216 or 218 calls a fitness function 220, which produces a fitness score 320 for each trial template 116 or 118. The fitness function 220 then accepts the image bounding rectangles 120 of the highest-scoring trial template 116 or 118 as the transformed components 112, and updates the transform matrix 314 to incorporate the transform 316 or 318 that produced the accepted template components 120. Due to the use of connected components, the similarity measure is robust to changes in the document that do not cause significant changes it's overall structure.

Figure 6:
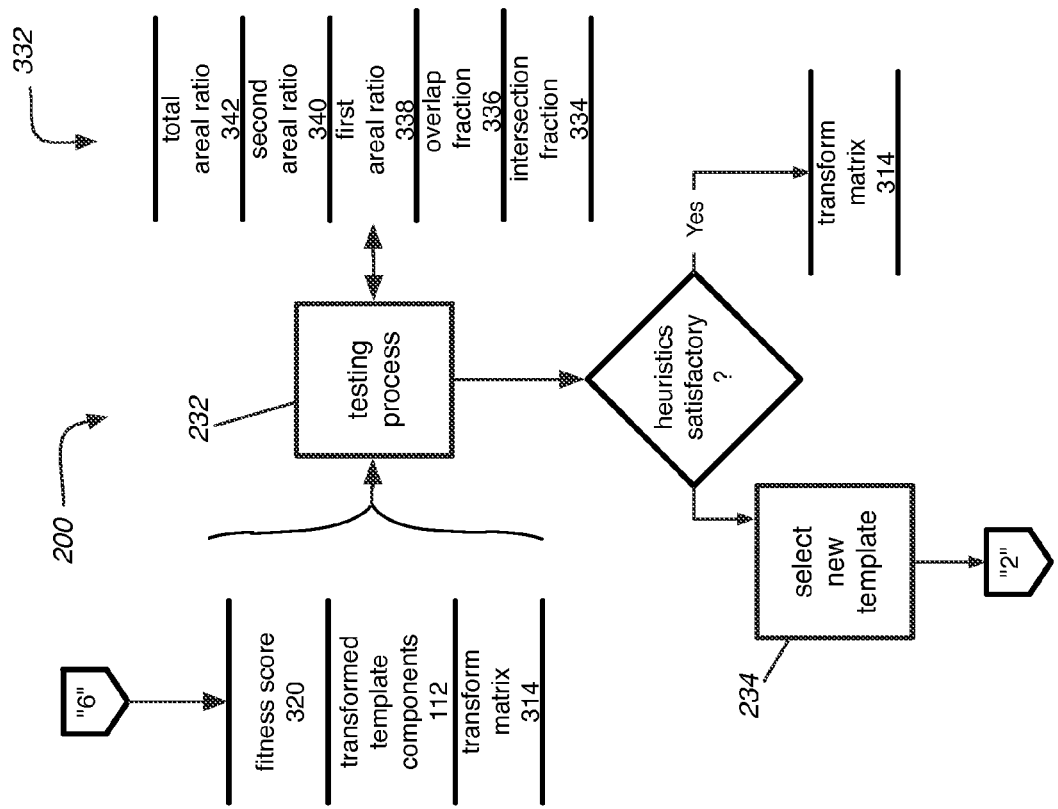

The fitness function 220 returns the transform matrix 314, the fitness score 320, and the transformed components 112 to the calling stage 216 or 218, which applies a new set of trial transforms 316 or 318 to the new transformed components 112. When no transform in a new set of trial transforms produces a set of trial components 120 with a higher fitness score 320 than the set of transformed components 112, the hill-climbing stage 216 or 218 has reached a local optimum, and is finished. Thus, after iterating stage 216 the hill-climbing process repeatedly executes stage 218, then exits to a testing process 232 as shown in FIG. 6.

In an embodiment of the invention, as shown in FIG. 4, the fitness function 220 generates a fitness score 320 for each one of the trial templates 116 or 118 (collectively labeled as "114" in FIGS. 4 and 5), based on an intersecting-areas algorithm 222 that produces a QuadTree (recursive grid partitioning) representation 22 of the document image components 12 as well as a QuadTree representation 122 of each trial template 114. By comparison of the QuadTrees 22 and 122, as also shown in FIG. 5, the algorithm 222 detects or generates for each trial template 114 a set 322 of component intersections 323 and of differences 324 between the areas of each trial image-bounding rectangle 120 and its intersecting document image-bounding rectangle 12. Some embodiments of the inventive method 200 utilize a threshold criterion, such as a size filter, to exclude certain connected components, thereby enhancing robustness of the fitness function 220. In select embodiments, size-filtering of the document image-bounding rectangles 12 can provide the advantage that non-structural changes, such as when a name is written into a name field, will have no significant effect on the document's alignment to an existing template.

Referring to both FIGS. 4 and 5, at a step 224 the fitness function 220 selects the intersection 323 with the smallest corresponding areal difference 324. At a step 226, overlapping areas 326 of the image bounding rectangles 12 and 120 are calculated at each of the intersections 323, and are summed over the entire set of trial image-bounding rectangles 120 to generate an aggregate overlap area 328. At a step 228, the aggregate overlap area is divided by a total 128 of all template component areas 124 to generate the intersecting-areas fitness score 320. At a step 231 the fitness function 220 also calculates a potential seed value 331 for the next set of trial transforms. For example, in some embodiments, the seed value 331 may be calculated based on a vector between the center point 14 of a selected document image-bounding rectangle 12, and a center point 124 of a trial image-bounding rectangle 120 intersecting with the selected document component. In select embodiments the document component 12 may be selected based on its distance from the mean weighted center point 20 of the document 10. The trial template 114 that has the highest fitness score 320 is accepted as a new set of transformed image-bounding rectangles 112, while the corresponding seed 331 is used to generate a new set of trial transforms 316 or 318. In some embodiments a seed 331 is calculated for each trial template 114, while in other embodiments, a seed 331 is calculated only from the accepted template 112.

Referring specifically to FIG. 4, at the first stage 216 of the hill-climbing process 214, the set of trial transforms 316 consists of large affine translations of the transformed template image-bounding rectangles or components 112 to provide a best fit of a trial template weighted center point 130 to the document weighted center point 20. At the second stage 218, each set 318 of trial transforms can include smaller translations, rotations, shear or skew transforms, and scalings of the transformed image-bounding rectangles 112 to obtain a best fit of each trial weighted center point 124 to each document center point 14.

At a local optimum of its second stage 218, the hill-climbing process 214 returns a best fit final version of the aggregate transform matrix 314, which represents an optimal sequence of affine transforms from template 100 to image 10.

Referring to FIG. 6, the inventive method 200 may also include a testing process 232, in which the aggregate transform matrix 314 is tested against or compared to a set of heuristics 332. For example, a value less than 0.5 or greater than 1.2 for the intersecting-areas fitness score 320 may indicate poor alignment or an incorrect document. Moreover, the testing process 232 may determine a fraction 334 of the transformed image-bounding rectangles 112 for which an intersection 322 has been detected with a corresponding overlapping document image rectangle 12, with values less than 0.5 indicating poor alignment or an incorrect document. Further, the testing process 230 may calculate a fraction 336 of document image rectangles 12 with corresponding overlapping template rectangles 112, where values less than 0.5 mean poor alignment or an incorrect document.

The aggregate or total overlapping area 328 of all template image-bounding rectangles, divided by the total template area 128, may also be assessed to obtain a first areal ratio 338 as a double-check on the locally optimal transform matrix 314. Values of the first areal ratio, less than 0.5, would indicate poor alignment or an incorrect document. Also, the aggregate or total overlapping area 328 of all image-bounding rectangles 12, divided by the total document area 28, can be calculated as a second areal ratio 340, where values less than 0.5 again would indicate a poor alignment or an incorrect document. Additionally, if a ratio 342 of total document area 28 to total template area 128 is less than 0.8, or exceeds 1.2, poor scaling could be indicated.

In some embodiments of the invention, an unsatisfactory result from the testing process 232 may cause the method 200 to continue through a step 234 of selecting a different template 100 than was initially selected, then returning to the initial transform algorithm 202, as shown in FIG. 2. Such an embodiment could be used, for example, to categorize a stack of related documents among various templates. As one example, financial documents of a business could be sorted into bank account statements, payroll statements, invoices, tax forms, and miscellaneous categories by iterative application of the inventive method 200 to identify a template 100 corresponding to each document in a scanned stack.

In some embodiments of the invention, if the inventive method 200 is provided with a document 10 such that the testing process 232 does not return a satisfactory result for any one of the templates 100, then a new template may be generated based on the document 10. Such an embodiment could be used, for example, to collate related sheets among a mixed or shuffled stack of documents.

Figure 7:
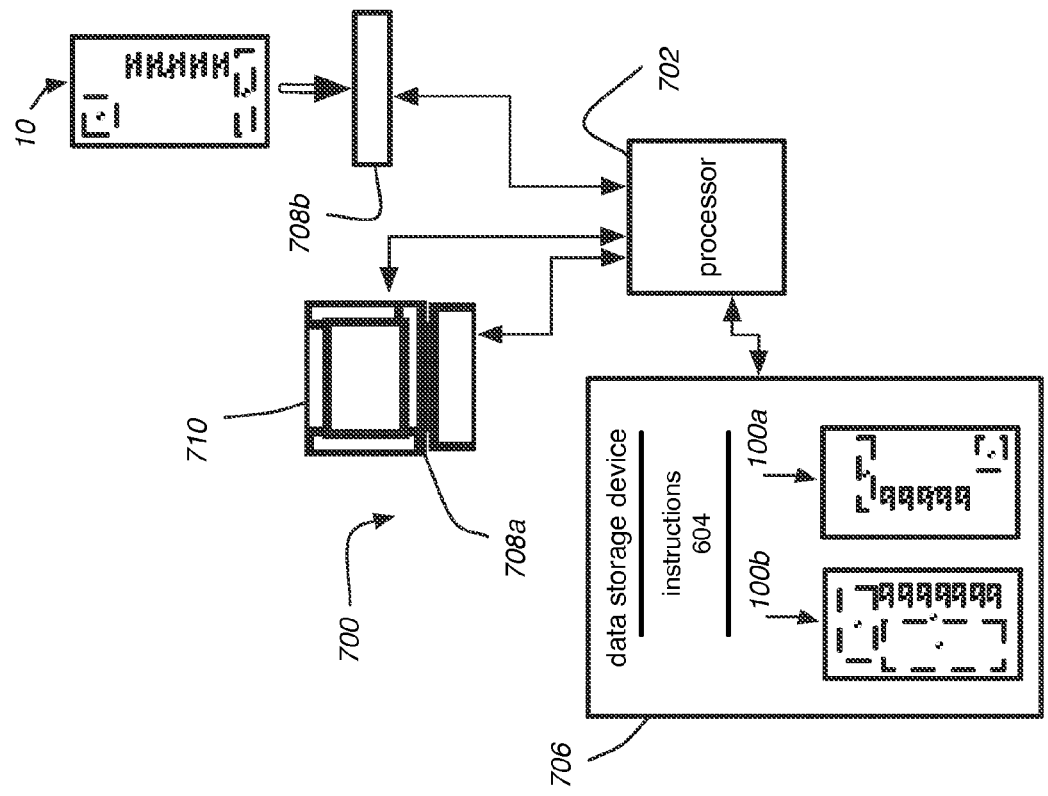
FIG. 7 shows a schematic view of a system for implementing the method shown in FIGS. 1-6.

In some embodiments of the invention, the inventive method 200 may be implemented in a computer system 700, as shown in FIG. 7. For example, the computer system 700 may include a processor 702, which is configured by instructions 704 to implement the method 200. The instructions 704 may be read by or sent to the processor 702 from a data storage device 706 (such as, for example, flash media, dynamic random access memory, optical encoded media, magnetic tape, or any equivalent device as understood by a worker skilled in computer technology) that is in communication with the processor. The instructions 704 may be read either automatically on connection of the storage device 706 to the processor 702, or in response to further instructions provided to the processor or to the storage device via an input device 708*a* (such as, for example, a keyboard, pointer, touch screen, optical scanner, or communications port in communication with the processor). In response to the instructions 704, the processor 702 is configured to obtain electronic representations of the document 10 and of the template 100 from the data storage device 706, and/or from a second input device 708*b*. The processor 702 may also be configured to display results of the method 200 via a display device 710 (such as, for example, a printer, a display, or a communications port).

Although the invention has been shown and described with respect to the detailed embodiments thereof, it will be understood by those of skill in the art that various changes may be made and equivalents may be substituted for elements of the inventive method and apparatus for document to template alignment, without departing from the scope of the invention. For example, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure, as specifically delineated by the following claims.

What is claimed is:

1. A method for aligning a document to a template, comprising:
    identifying connected components of the document;
    determining document image-bounding rectangles corresponding to at least some of the connected components of the document;
    iteratively transforming pre-determined template image-bounding rectangles to match the document image-bounding rectangles;
    aggregating transformations of the template image-bounding rectangles to generate a transform matrix; and
    transforming the document according to an inverse of the transform matrix.

2. A method as claimed in claim 1, wherein transforming pre-determined template image-bounding rectangles includes:
    calculating a center point and an associated weight metric of each of a plurality of the document image-bounding rectangles, and a mean weighted center point of the plurality of document image-bounding rectangles;
    calculating an initial transform to be uniformly applied to each of the pre-determined template image-bounding rectangles, such that a pre-determined mean weighted center point of the template image-bounding rectangles will be aligned to the mean weighted center point of the document image-bounding rectangles; and
    applying the initial transform to the template image-bounding rectangles.

3. A method as claimed in claim 1, wherein transforming pre-determined template image-bounding rectangles includes:
    generating a plurality of trial transforms;
    applying each of the plurality of trial transforms to the template image-bounding rectangles to produce a corresponding plurality of trial templates each including a plurality of trial image-bounding rectangles;
    calculating a fitness score for each of the plurality of trial templates; and
    accepting one of the plurality of trial templates as a transformed template.

4. A method as claimed in claim 3, wherein during a first stage of iteratively transforming pre-determined template image-bounding rectangles, each of a plurality of first stage trial transforms is an affine translation; and during a second stage of iteratively transforming pre-determined template image-bounding rectangles, each of a plurality of second stage trial transforms is an affine transform smaller than an average size of the plurality of first stage trial transforms.

5. A method as claimed in claim 3, wherein each of the plurality of trial transforms includes a translation.

6. A method as claimed in claim 3, wherein the plurality of trial transforms includes at least one of a translation, a rotation, a shear, a skew, or a scaling.

7. A method as claimed in claim 6, wherein the plurality of trial transforms includes at least two of a translation, a rotation, a shear, a skew, or a scaling.

8. A method as claimed in claim 7, wherein at least one of the plurality of trial transforms includes at least two of a translation, a rotation, a shear, a skew, or a scaling.

9. A method as claimed in claim 3, wherein calculating a fitness score includes:
    identifying at least one trial image-bounding rectangle that intersects a document image-bounding rectangle; and
    calculating an overlap area of the intersecting image-bounding rectangles.

10. A method as claimed in claim 9, wherein calculating a fitness score includes calculating an aggregate overlap area of the plurality of trial image-bounding rectangles with the plurality of document image-bounding rectangles.

11. A method as claimed in claim 3, wherein calculating a fitness score includes generating a seed value for a next plurality of trial transforms, and generating a plurality of trial transforms includes modifying a plurality of pre-determined transforms based on a seed value.

12. A method as claimed in claim 11, wherein generating a seed value includes selecting a document image-bounding rectangle maximally distant from a mean weighted center point of the document, and calculating a vector from the center point of the selected document image-bounding rectangle to the center point of a trial image-bounding rectangle that intersects the selected document image-bounding rectangle.

13. A method as claimed in claim 1, wherein pre-determined image-bounding rectangles of the template are determined from an electronic template image file generated by optically scanning a paper template.

14. A method as claimed in claim 1, wherein determining document image-bounding rectangles includes excluding connected components of the document by comparison to a threshold criterion.

15. A method as claimed in claim 1, wherein identifying connected components of the documents includes optically scanning an object.

16. A method as claimed in claim 1, wherein transforming the document includes modifying an electronic image of the document.

17. A method as claimed in claim 1, further comprising testing the transform matrix against pre-determined heuristics.

18. A method as claimed in claim 17, further comprising selecting a new template based on the results of testing the transform matrix.

19. An apparatus for aligning an electronic image of a document to an electronic image of a template, comprising:
a processor configured by instructions to:
obtain the electronic image of the document;
identify, within the electronic image of the document, connected components of the document;
determine document image-bounding rectangles corresponding to at least some of the connected components of the document;
iteratively transform pre-determined template image-bounding rectangles to match the document image-bounding rectangles;
aggregate transformations of the template image-bounding rectangles to generate a transform matrix; and
transform the electronic image of the document according to an inverse of the transform matrix; and
a data storage device connected in communication with the processor, the data storage device storing at least one of the instructions, the electronic image of the document, or the electronic image of the template.

20. An apparatus as claimed in claim 19, wherein the instructions include instructions for generating an electronic image of a new template based on the electronic image of the document.

21. An apparatus as claimed in claim 19, wherein instructions to transform pre-determined template image-bounding rectangles include instructions for:
calculating a center point and an associated weight metric of each of a plurality of the document image-bounding rectangles, and a mean weighted center point of the plurality of document image-bounding rectangles;
calculating an initial transform to be uniformly applied to each of the pre-determined template image-bounding rectangles, such that a pre-determined mean weighted center point of the template image-bounding rectangles will be aligned to the mean weighted center point of the document image-bounding rectangles; and
applying the initial transform to the template image-bounding rectangles.

\* \* \* \* \*